United States Patent

[11] 3,589,506

| [72] | Inventors | Andrew George Ford<br>Hitchin;<br>Ronald Augustus Hudson, Welwyn,<br>Garden, both of, England |
|---|---|---|
| [21] | Appl. No. | 749,496 |
| [22] | Filed | Aug. 1, 1968 |
| [45] | Patented | June 29, 1971 |
| [73] | Assignee | Imperial Chemical Industries, Limited<br>London, England |
| [32] | Priority | June 14, 1968, June 14, 1968, June 14, 1968, Aug. 1, 1967 |
| [33] | | Great Britain |
| [31] | | 28352/68, 28355/68, 28357/68 and 35336/67 |

[54] PLASTICS CONTAINERS AND PACKAGES
15 Claims, 8 Drawing Figs.

[52] U.S. Cl. .................................................. 206/46,
150/1, 222/394, 229/14
[51] Int. Cl. ..................................................... B65d 83/14
[50] Field of Search............................................ 229/14 B, 7
S; 150/1; 222/105, 566, 567, 570; 99/171 B, 176;
206/46

[56] References Cited
UNITED STATES PATENTS

| 3,358,821 | 12/1967 | Weisberg...................... | 206/56 A |

FOREIGN PATENTS

| 926,159 | 5/1963 | Great Britain................ | 229/14 B |
| 520,561 | 6/1953 | Belgium ....................... | 222/566 |
| 900,753 | 7/1962 | Great Britain................ | 222/567 |
| 957,509 | 5/1964 | Great Britain................ | 222/567 |
| 1,447,945 | 6/1966 | France ......................... | 222/105 |
| 649,849 | 12/1962 | Italy ............................. | 222/105 |

*Primary Examiner*—Joseph R. DeClair
*Assistant Examiner*—John M. Caskie
*Attorney*—Cushman, Darby and Cushman

ABSTRACT: Plastics film container for contents under superatmospheric pressure, closed by a bunched neck provided with a sealable material forming an internal gasket, and an external mechanical closure, and with a releasably sealed tube passing through the bunched neck.

PATENTED JUN29 1971                                3,589,506

INVENTORS
ANDREW GEORGE FORD
RONALD AUGUSTUS HUDSON

BY Cushman, Darby & Cushman
ATTORNEYS

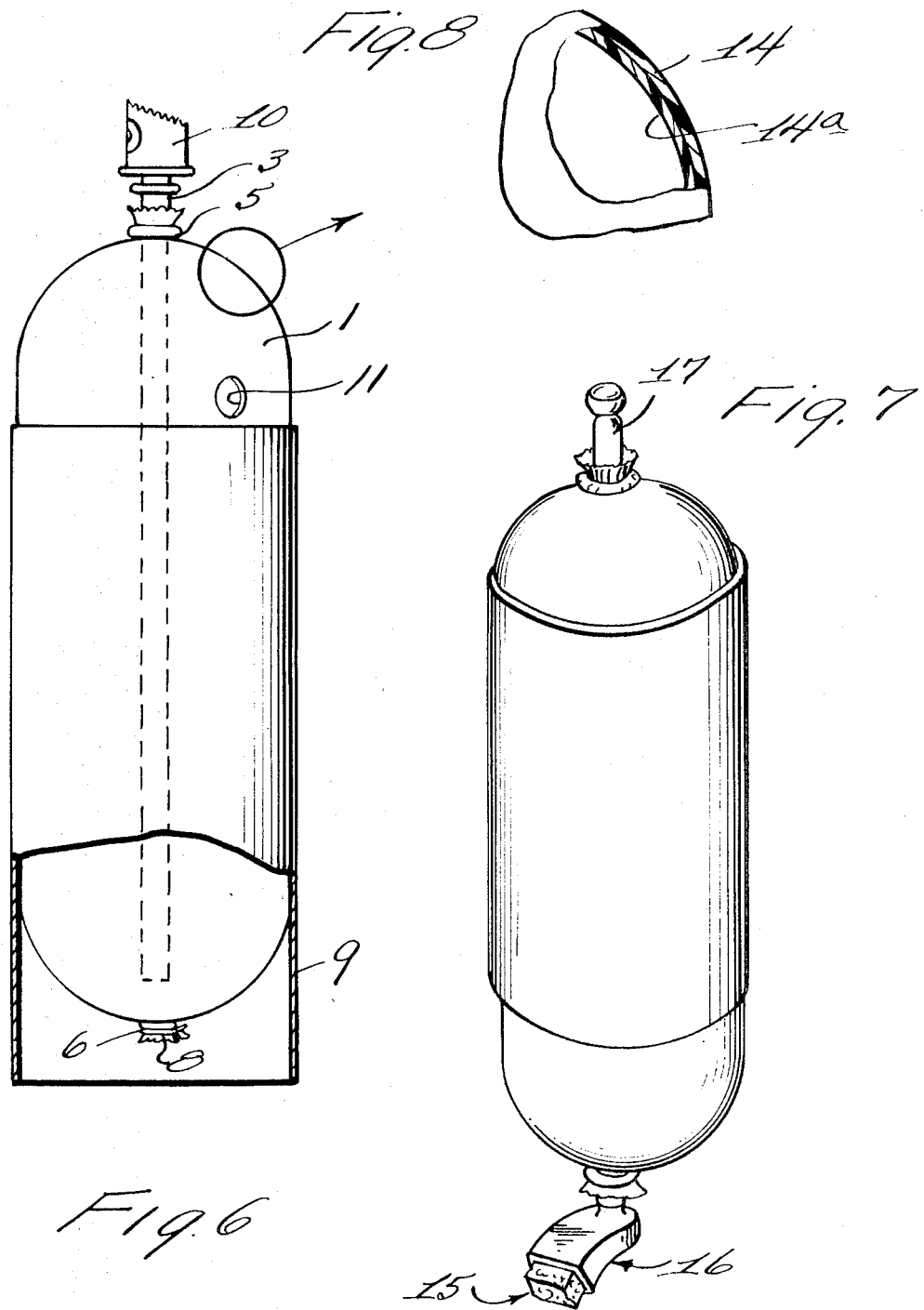

PLASTICS CONTAINERS AND PACKAGES

This invention relates to containers of plastics film for contents under superatmospheric pressure, and to packages comprising such containers with contents under superatmospheric pressure.

The invention relates particularly to plastics film containers for gas-containing liquids, particularly carbonated drinks. It may also be applied to the packaging of other liquids or of articles or solid substances in plastics film containers made rigid by enclosing therein a gas or vapor under pressure, to increase sales appeal or to protect fragile contents. It may also be used in packaging gases, alone, or low boiling liquids that generate pressure under normal storage conditions. In the term "gas" we shall hereinafter include vapors of low boiling liquids, e.g. aerosol propellents.

The invention provides a plastics film container composed of one or more layers of plastic film for contents under superatmospheric pressure, the container being closed by at least one bunched neck gripped by an encircling mechanical closure thereon, and having a length of substantially rigid tubing passing through the bunched neck into the container, and there being disposed between the film layers and the tube where these are gripped by said closure a layer or layers of material effective as a gasket to seal any capillaries leading from inside the container to the atmosphere.

The container is preferably formed without seams. In a preferred form of the invention the container is formed from a length of plastics tubular film closed at both ends by bunching the end portion of the tubing and securing it in a gastight manner, the closure at one or both ends being formed to include a tube passing therethrough in the manner hereinbefore described.

The length of substantially rigid tubing, which is open at its inner end to the contents of the container, may at its other end be provided, or adapted to be provided, with a releasably valved outlet, or may be closed by a seal or bung.

By the term "substantially rigid" as applied to the length of tubing throughout this specification, we mean that the tubing is sufficiently rigid to resist total collapse by the mechanical closure when this is applied to the neck sufficiently tightly to retain the pressure within the container. It is however preferred that the tubing be slightly compressed, or indented, by the ligature when so applied, for reasons that will be described hereinafter. The wall thickness and the material from which the tubing is formed will thus be selected appropriately for a particular use of the container. It is generally preferred that the tubing be formed of a plastics material, for example of nylon, polythene (polyethylene) or polypropylene. When the container is to be used for carbonated drinks or other potable liquids, the tubing is of course required to be of nontoxic material.

The neck of the container will generally be bunched simply by gathering it up into the closure, but it may if desired also include a degree of systematic folding or twisting.

The layer or layers of material effective as a gasket between the film layers and the tubing at the neck of the container may conveniently be of a flexible sheet material, such as paper or plastics film, coated on both sides with contact adhesive and applied around the inside wall of the neck of the container, without creasing, before the neck is bunched. Alternatively, the layer or layers may be of a material such as a cold adhesive or, preferably, a hot melt adhesive (melting at a temperature below the melting point of the film and tubing) coated upon the inner wall of the neck.

When the container is a tubular container closed at both ends by a bunched neck, and with a tube as described passing through only one neck, the other end is preferably closed by one of the methods described below. The container may be closed by at least one bunched neck, with a ligature or other encircling closure applied to the bunched neck below a region thereof that is of greater cross-sectional area than the region encompassed by the encircling closure, and all capillaries through the bunched neck are sealed against egress of gas from the container. The region of greater cross-sectional area may conveniently be provided by the inclusion of additional layers of material, preferably in the seal provided to seal the capillaries. Thus, for example, it may be provided by a layer of gasketing material inside the neck (similar to that used between the tubing and the film layers, in accordance with the present invention) or by additional layers on the outside, provided, for example, by turning over and sealing down the end of the container before the neck is bunched.

One particular form of the invention will now be described by way of example with reference to the accompanying drawings, which show diagrammatically stages in the formation of a container, and in which:

FIG. 6 shows a container with tubing passing through one bunched neck having a supporting sleeve disposed partially about the container.

FIG. 7 shows a container with tubing passing through each bunched neck and having a spreader disposed on one of the necks. A supporting sleeve is disposed partially about the container.

FIG. 8 is a cross section of a portion of the wall defined by the arrow of the container of FIG. 6.

Figure 1:
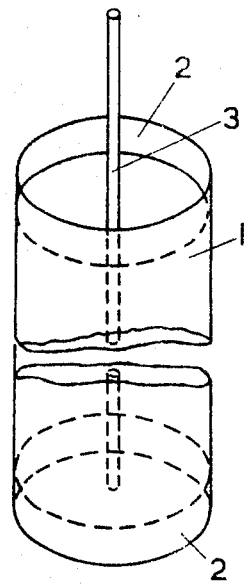
FIG. 1 shows the container blank and the tubing, with a gasket layer in position at both ends but with the ends not yet closed.
Figure 2:
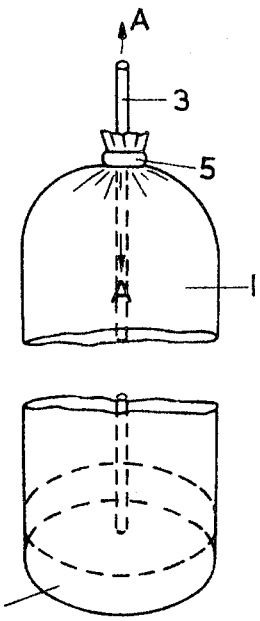
FIG. 2 shows the container with one neck closed upon the tubing.
Figure 4:
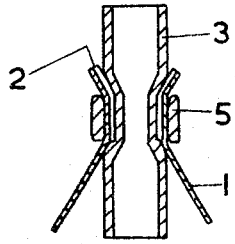
FIG. 4 is a section through A-A in FIG. 2.
Figure 3:
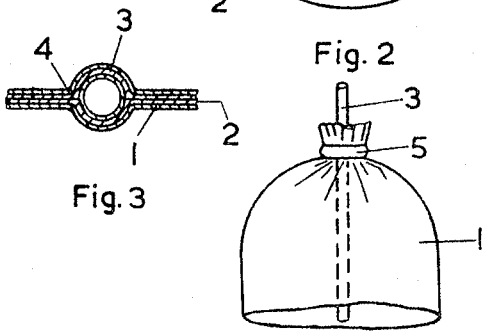
FIG. 3 is a section through the length of tubing and a portion of the neck of the container in the region of the gasket, after the gasket layers have been sealed but before the neck has been bunched.
Figure 5:
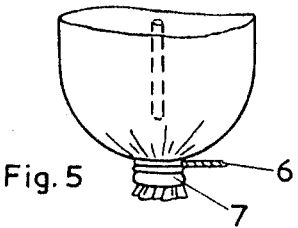
FIG. 5 shows the finished container.

In these FIGS.: 1 is the container blank, which is a length of seamless plastics tubular film, suitably a 9 in. × 2.5 in. length of biaxially oriented polyethylene terephthalate tubular film of 0.0008 in. wall thickness; at 2 are shown strips of tape coated on both sides with a contact adhesive, these being the gasket layers and being adhered around the inside surfaces of the tubular film, care being taken to ensure that no creases are formed which might subsequently form capillaries that would allow leakage of gas from the container; and 3 is a length of tubing passing through the open end of the container, suitably a length of low density (0.92 to 0.94) polythene tubing of outside and inside diameter about 0.175 in. and 0.135 in. respectively. With the tubing in the position shown in FIG. 1, the neck of the container blank is flattened and pressed closely around the tube, as shown in FIG. 3, care being taken that no gap is left at 4. The side portions of the sealed neck are uniformly pleated and pressed against the tube, a clip, 5, is uniformly compressed upon it all as shown in FIG. 2. The tube becomes slightly indented by the clip, as shown in FIG. 4. The clip is suitably a U-shaped clip, for example made of seven thirty-seconds in. × one thirty-second in. aluminum strip, of the type applied by passing it around the neck and clenching it so that the free ends of the clip pass each other and finally lie on upon the other. The open end of the tubular film is then flattened, and the opposed faces of the adhesive strip 2 become sealed together. The neck is tightly gathered and tied by a ligature, 6 (FIG. 5) applied immediately above the portion bearing the adhesive strip, and finally a clip, 7, similar to the clip 5, is applied upon the end of the neck. A ligature (not shown) may optionally be also applied upon the neck at the end carrying the tubing, immediately beneath the inner edge of the gasket.

The container may be filled either through the tubing or through the open end of the container before this has been closed. The tubing may if desired be a double tube, preferably a tube internally divided to provide a double channel through the bunched neck. Thus, for example, it may comprise two concentric tubes, to allow the container to be easily pressurized with gas before filling, and the gas displaced with the liquid to be packed. By using this procedure, frothing of the liquid may be avoided. Alternatively, a length of tubing may be provided through each neck of the tubular film to allow the container to be first pressurized and then filled with liquid through the tubing at one end, the displaced gas escaping through the tubing at the other end.

The container may alternatively be provided with a filling aperture in its wall (the tubing through its neck being used only for removing the contents) and filled by the method disclosed below. This method comprises: locating the filling aperture over an orifice in a substantially smooth surface, the orifice being connected to a source of a gas under superatmospheric pressure; inflating the container by the introduction of said gas while the container wall surrounding the aperture is held in substantially gastight contact with said surface; and, while the container is still fully inflated, sliding it along relative to said surface to bring that portion of the wall of the container which surrounds the aperture into contact with a supported flexible sealing strip held in substantially continuous relationship to said surface; and applying heat if necessary to seal the sealing strip to the wall of the container around the aperture. In this method, the container may also be filled with a liquid or particulate solid through the aperture. Articles to be packaged are placed in the container before an end is closed, and the package may be pressurized by the method described.

The indentation of the tubing by the clip, as shown in FIG. 4, ensures that when the container is inflated to a high pressure the clip is not forced off the tubing. This is further ensured by the ligature below the gasket region, if present.

The container is preferably formed without seams, as in the form particularly described. However, it may be formed with seams capable of resisting the maximum desired pressure in the container, particularly by lapped seals, which are not subjected to a peeling force under the conditions of use.

The container may be adapted to a wide variety of uses by providing various valved outlet devices on the tube. For example, the length of tubing may be provided with a valved outlet of the type allowing the container to be used as a siphon or an aerosol dispenser. Or it may be provided with a valve and an applicator for the contents, such as a brush, sponge, or other spreading device, the valve being operated, for example, by pressure on the applicator. The length of the tubing within the container will, of course, be adapted to the intended use of the container. Alternatively, the tubing may be provided merely for filling the container and emptying it in a single shot, or merely for pressurizing the container (as, for example, in the protective packaging of articles) in which case it may be plugged, or sealed at its end. Such containers may conveniently be opened by first cutting or unplugging the tubing to release the pressure relatively gently, and then cutting or tearing the container open.

The containers are preferably formed of oriented tubular film of polyethylene terephthalate. For the preferred tubular containers already described the polyethylene terephthalate film is preferably biaxially oriented in such manner that, where the circumferential draw ratio is $x:1$ and the longitudinal draw ratio is $y:1$, then the product $xy$ is from 7 to 16, preferably from 12 to 15, and the ratio $x/y$ is from 1.2 to 2.5, preferably from 1.3 to 1.8. By selecting draw ratios within this range, the thickness of film required to contain a given maximum pressure within the containers may be kept to a minimum, which gives an economic advantage. When the container is to be used in the packaging of beer or other carbonated drinks, it is preferably provided with a coating of a material highly impermeable to water vapor, dioxide and oxygen. Suitable materials for such coatings include vinylidene chloride polymers and copolymers, particularly copolymers of vinylidene chloride with a lesser proportion of acrylonitrile, for example copolymers containing between 80 percent and 95 percent by weight of vinylidene chloride and up to 20 percent of acrylonitrile and, if desired, small proportions of other monomers such as itaconic acid or methacrylic acid. These polymeric materials are also particularly suitable for forming gas impermeable coatings on films other than polyethylene terephthalate which may be used for making the containers. The coating may be applied to the inner or outer surface of the tubular film; it is usually more convenient to coat the outer surface. Such coatings have the additional advantage that they form strong heat seals.

Materials other than polyethylene terephthalate films that may be used for forming the containers include oriented or unoriented nylon films and oriented films of polypropylene, polyvinyl chloride, or copolymers of vinylidene chloride with minor proportions of other monomers, for example vinyl chloride, acrylonitrile or acrylic or methacrylic esters, the nature of the material, at least as to the inner wall of the container, being such as to have substantially no undesirable effect on the intended contents of the container.

While it is generally preferred to use a coating on the plastics film to provide the desired impermeability, the container may be a double-walled tube of plastics material to which one wall contributes high strength, and the other wall contributes a high impermeability to gases, and improved heat sealability, if desired. Thus, for example, tubular film having an outer layer of polyethylene terephthalate and an inner layer of vinylidene chloride polymer or copolymer may be used. Alternatively, a sufficient degree of impermeability to gases may be provided in, say, a container of polyethylene terephthalate film, by providing a tubular sleeve of an impermeable plastics material, such as vinylidene chloride polymer or copolymer, around substantially the whole of the cylindrical section of the container. The use of a tubular sleeve around the container, irrespective of whether it be made of a material the same as or different as that from which the container is made, can provide a number of advantages. One particular advantage, especially for use at very high pressure, is that it gives added strength against radial stress, which is greater than the stress upon the end sections of the filled tubular containers. Thus, the addition of a tubular sleeve covering only the cylindrical portion will allow the use for the container of thinner film, down to about half the thickness, than would otherwise be needed to give a container of adequate strength. Not only does this give a saving of material; it also facilitates the closing of the container, since thin film can be more easily closed by bunching or twisting than can thick film, without capillaries being left through the closure. An ancillary use of the sleeve is to enclose a label or decoration between itself and the container, when the sleeve is transparent, or to provide protection for print on the wall of the container.

The sleeve, when in the form of plastics tubing, may be easily placed in position by slipping it over the container before it is filled. Alternatively, the sleeve may be formed by wrapping or winding round the cylindrical part of the container a sheet or strip of plastics film, paper, or other flexible material having properties desired for the intended function of the sleeve, and sealing it into tubular form by heat or adhesive. Thus, for example, when the pack contents are carbonated drinks, these may be chilled before being introduced into the pack, to reduce the pressure they initially exert. The sheet material may then be wrapped or spirally wound around the pack and sealed while the contents are still chilled. When the pack reaches room temperature it expands so that the sleeve exerts a reinforcing action. The cylindrical sleeve, if of a sufficiently stiff material, may if desired be extended to the extremity of the container at the end opposite to the end carrying the length of tubing, to form a freestanding support.

A filled container provided with such a supporting sleeve is shown diagrammatically in FIG. 6 of the accompanying drawings. In this drawing: 1 represents the container; 3 the length of substantially rigid tubing; 5 a clip gripping the bunched neck round the tubing; 6 a ligature tightly encircling the neck of the other end of the container, immediately inwardly of a thickened sealed region 8; and 9 is a tubular supporting sleeve of paper which is extended at its lower end to provide a stand for the container. A spray nozzle is shown at 10 and a filling aperture at 11.

FIG. 7 illustrates a container similar to that of FIG. 6 except that it is provided with a spreading device 15 and a holder 16 which is internally valved (internal valve not shown) at one end, while the opposite end has a sealed, rigid tubing 17 passing through the bunched neck thereof.

FIG. 8 shows a portion of the wall of the container of FIG. 6 wherein the plastic film is a double walled plastic film having an outer wall 14 and an inner wall 14a.

When a close-fitting sleeve is placed upon the cylindrical part of the container to provide increased bursting strength, and the container is formed of polyethylene terephthalate film, it is often preferred that the container be formed of film that is oriented to a higher draw ratio in the longitudinal than in the circumferential direction, while still having a product of draw ratios within the range 7 to 16. This will give improved bursting strength in the two ends of the container, which are not supported by the sleeve.

The containers may be used for retailing, for example, beer and carbonated soft drinks, such as soda water and tonic water, particularly when a pack is desired which is not intended to be totally emptied as soon as it is opened. As indicated hereinbefore, however, the containers are especially useful as aerosol dispensers, and also for materials that are applied by spreading by means of an applicator. Products that may be packed in such manner include, for example, household and toilet products that are advantageously dispensed as an aerosol spray, such as liquid polishes, window cleaning fluids, disinfectants and deodorants, perfumes, starch solutions, hair lotions, toilet water; liquids and pastes for application by spreading, such as paints, varnishes adhesives, shoe creams and other polishes; pharmaceutical sprays; food products such as synthetic creams and salad dressings; and garden preparations such as insecticides, fungicides and herbicides. The containers may also be used for packaging powders, such as insecticides, under pressure of a gas, so that these may be dispensed by puffing. They may also be used for packaging gases under pressure, and for packaging volatile liquids that generate a superatmospheric pressure during storage.

The containers may be provided with a freestanding support, such as a carton, if desired.

We claim:

1. A package comprising a plastics film container and contents under superatmospheric pressure, the said container comprising a length of oriented, seamless tubular film which is closed at both of its ends by a bunched neck gripped by an encircling mechanical closure thereon, a length of substantially rigid tubing passing through a said bunched neck into the container and a gasket disposed between the film and the tubing where the film is gripped by the closure, said gasket being effective to seal any capillaries leading from inside the container to the atmosphere and thereby seal the said container and rigid tubing from the atmosphere, said gasket comprising a flexible tape coated on both sides with adhesive and applied around the inner surface of the neck of the container before bunching.

2. A package as claimed in claim 1 in which the plastics film is biaxially oriented film of polyethylene terephthalate.

3. A package as claimed in claim 1 in which the film bears a coating of a vinylidene chloride polymer or copolymer.

4. A package a claimed in claim 1, formed of double-walled plastics tubing.

5. A package as claimed in claim 1, provided with a tubular supporting sleeve around substantially the whole of the cylindrical part of the container.

6. A package as claimed in claim 1 in which the wall of the substantially rigid tubing is indented by the encircling mechanical closure.

7. A package as claimed in claim 1 in which the container has a length of substantially rigid tubing passing through each bunched neck.

8. A package as claimed in claim 1 in which the container material is formed from polyethylene terephthalate film that has been biaxially oriented to draw ratios such that, where the circumferential draw ratio is $x$:1 and the longitudinal draw ratio $y$:1, then the product $xy$ is from 12 to 15 and the ratio $x/y$ is from 1.3 to 1.8.

9. A package as claimed in claim 1 which contains a liquid and an aerosol propellant.

10. A package claimed in claim 1, with contents including a gas under superatmospheric pressure.

11. A package as claimed in claim 1 in which the substantially rigid tubing is of a plastics material.

12. A package as claimed in claim 11 in which the plastics material is selected from the group consisting of polythene, polypropylene and nylon.

13. A package as claimed in claim 1 in which the container material is formed from polyethylene terephthalate film that has been biaxially oriented to draw ratios such that, where the circumferential draw ratio is $x$:1 and the longitudinal draw ratio $y$:1, then the product $xy$ is from 7 to 16 and the ratio $x/y$ is from 1.2 to 2.5.

14. A package as claimed in claim 13 in which the container is provided with a tubular supporting sleeve around substantially the whole of the cylindrical part of the container.

15. A package as claimed in claim 14 in which the tubular supporting sleeve is extended at least to the level of the lowermost part of the container, to provide a free standing support.